United States Patent Office 3,499,008
Patented Mar. 3, 1970

3,499,008
BUTYL ESTER OF BIS(GLYCIDYLOXY-4-PHENYL) ACETIC ACID
Pierre Talet, Alfortville, and Robert Behar, Paris, France, assignors to Nobel-Bozel, Paris, France, a joint-stock company of France
No Drawing. Filed Apr. 27, 1965, Ser. No. 451,340
Claims priority, application France, Apr. 29, 1964, 972,884
Int. Cl. C07d 1/18
U.S. Cl. 260—348                                             1 Claim

ABSTRACT OF THE DISCLOSURE

The present disclosure relates to a new group of derivatives of bis (hydroxy-4-phenyl) acetic acid, a method of forming such derivatives, and the uses of such derivatives. Among the new compounds are chlorinated derivatives, esters, salts, bis-acetylated derivatives, and epoxies. The new compounds are useful as herbicides, fungicides, bactericides, as ingredients in thermosetting acrylic paints, and as starting materials for the preparation of epoxy resins.

---

The present invention relates to new derivatives of bis (hydroxy-4-phenyl) acetic acid having valuable properties for a number of industrial fields.

The compounds according to the invention comply with the general formula:

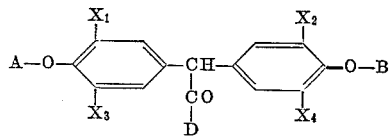

In this formula, each of the terms $X_1$, $X_2$, $X_3$ and $X_4$ represents a halogen atom (chlorine or bromine) or a hydrogen atom; the term D represents a chlorine atom or one of the groups —OH, —O—CH$_3$, —(CH$_3$)$_2$

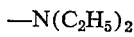

or a residue of the general formula —O—R$_1$ (the symbol R$_1$ representing an aliphatic hydrocarbon residue, such as an alkyl group, or an alicyclic or aromatic hydrocarbon residue preferably having no more than ten carbon atoms) or a residue of the general formula:

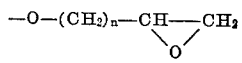

in which n=1 or 2. The terms A and B represent hydrogen or a group —CH$_2$—COOH or —CH$_2$—COOR or —CO—R (in which R is an aliphatic hydrocarbon residue such as an alkyl group, or an alicyclic or aromatic hydrocarbon residue preferably having no more than ten carbon atoms) or an alpha-epoxy residue such as a residue of the general formula:

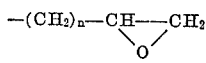

in which $n$ is equal to 1 or 2. When at least one of the terms $X_1$, $X_2$, $X_3$ and $X_4$ represents an atom of chlorine, the terms A and B may further represent a hydrogen atom.

Amongst the new products of the invention, there may be more particularly cited;
Bis (dichloro-3,5-hydroxy-4-phenyl) acetic acid:

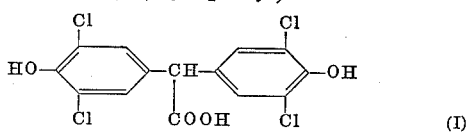

or the corresponding compounds only comprising one, two or three atoms of chlorine per molecule or a content of chlorine intermediate between these values;

The corresponding methyl esters, such as bis (dichloro-3,5-hydroxy-4-phenyl) methyl acetate:

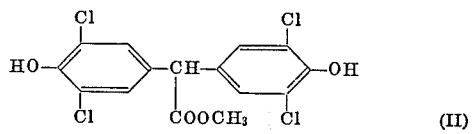

or the corresponding compounds comprising only one, two or three atoms of chlorine per molecule or a content of chlorine intermediate between these values;

The bis (carboxy-methoxy-4-phenyl) acetic acids having the formula:

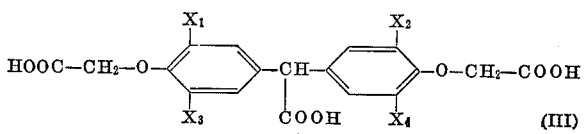

and more particularly:
Bis (carboxy-methoxy-4-phenyl) acetic acid:

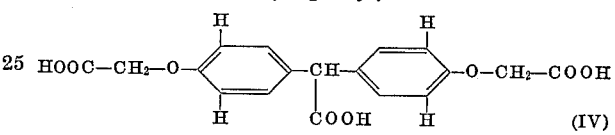

Bis (dichloro-3,5-carboxy-methoxy-4-phenyl) acetic acid:

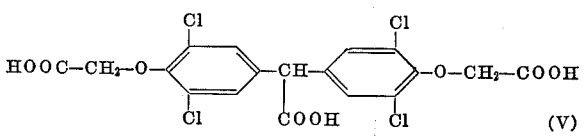

or the corresponding compounds only comprising one, two, or three atoms of chlorine per molecule or a content of chlorine intermediate between these values; or the corresponding compounds in which the chlorine is replaced by bromine;

The esters of the bis (acrboxy-methoxy-4-phenyl) acetic acids having the formula:

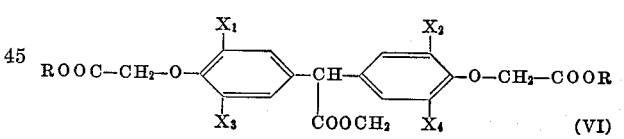

and more particularly:
The diethyl and monomethyl ester of bis (carboxy-methoxy-4-phenyl) acetic acid:

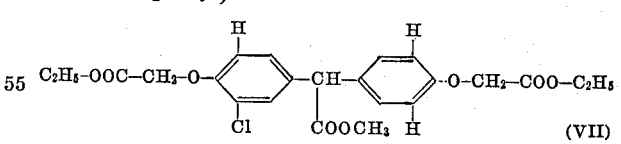

The alkyl esters of bis (di-chloro-3,5-carboxy-methoxy-4-phenyl) acetic acid:

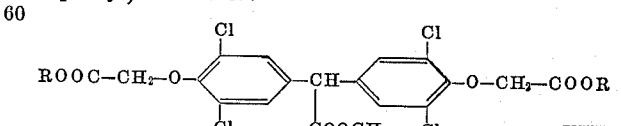

wherein R is an alkyl group such as propyl, butyl, and the like or an alicyclic hydrocarbon residue (cyclobutyl, cyclopentyl, cyclohexyl, and the like) or an aromatic hydrocarbon residue (phenyl, naphthyl, and the like); or the corresponding compounds only comprising one, two or three atoms of chlorine per molecule or a chlorine content intermediate between these values; or the corresponding compounds in which the chlorine is replaced by bromine.

The salts of the above-mentioned acids with the amines and more particularly, amongst others, the salts of bis (dichloro - 3,5 - hydroxy - 4 - phenyl) acetic acid with the imidazoles, in particular with methyl-2-imidazole:

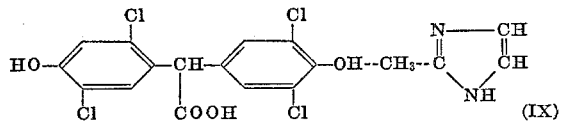

The bis-acetylated derivative of bis (dichloro-3,5-hydroxy-4-phenyl) acetic acid:

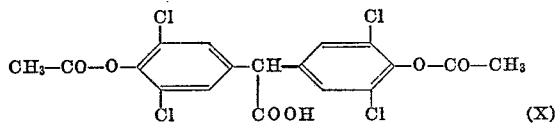

The acid chloride of the above acid (X):

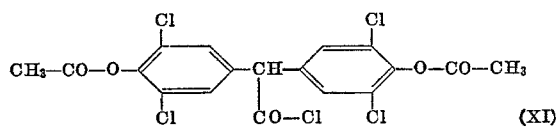

The N,N-dimethyl-acetamide of the compound (XI):

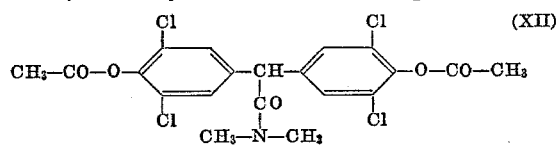

The bis (dichloro-3,5-hydroxy-4-phenyl)-N,N-dimethyl-acetamide:

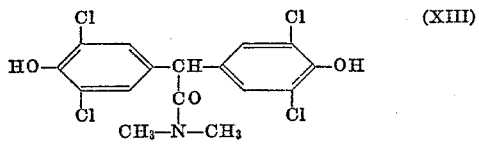

The butyl ester of bis (glycidyl-oxy-4-phenyl) acetic acid:

(XIV)

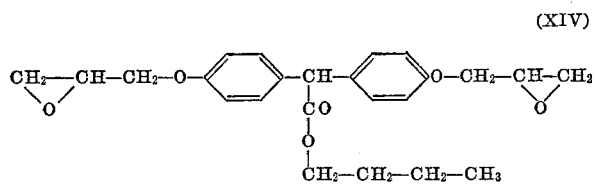

The glycidyl ester of bis (glycidyl-oxy-4-phenyl) acetic acid:

(XV)

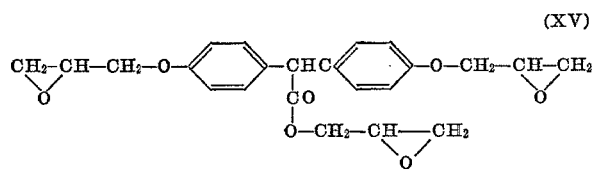

These new products constitute useful chemical agents in consequence of their herbicidal, fungicidal or bactericidal properties; some of them can also be employed especially as useful constituents of thermosetting acrylic paints or as raw materials for the preparation of a new category of epoxy resins.

Amongst the halogenated products, the chlorinated derivatives have proved to be particularly valuable. These products have been prepared with different rates of chlorination, which has made it possible to obtain more or less highly-chlorinated derivatives of bis (hydroxy-4-phenyl) acetic acid and its esters, and in particular of its methyl ester, its imidazole salts, its acid chlorides and its amides.

When so desired, the chlorinated and non-chlorinated products can, also, be modified by treatment with chlorinated compounds such as monochloro-acetic acid (or its esters), or the acetyl chloride; this has made it possible to prepare the carboxy-methylated or acetylated derivatives on the phenol hydroxyls.

In the case of the reaction with chlorine, as in the case of the reaction with the chlorinated compounds, there is elimination of an atom of hydrogen in the form of HCl and substitution in place of the hydrogen of the remainder of the molecule of the reacting product; this substitution is effected on the benzene nucleus in the case of chlorine and on the phenol oxygen in the case of chlorinated compounds (acetyl chloride, monochloro-acetic acid):

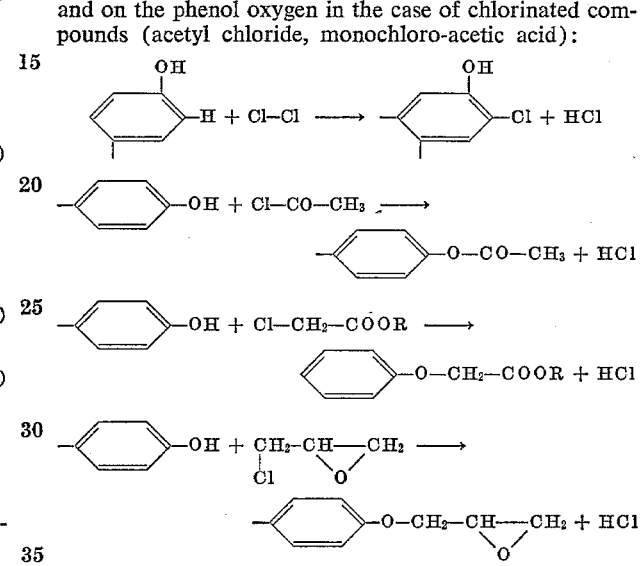

The operation is preferably carried out in the presence of a substance with an alkaline reaction in order to fix the hydrochloric acid liberated.

The method of preparation of the compounds of the invention thus consists of reacting the bis(hydroxy-4-phenyl)acetic acid or one of its esters with a halogen such as chlorine or bromine and/or with a halogen-comprising compound such as an acyl halide like acetyl chloride, a halogeno-carboxylic acid such as monochloro-acetic acid, when so desired in the state of ester, or a halide of alpha-epoxy, the reaction being carried out in such manner that the halogen and the compound comprising the halogen react on the molecule of the said acid with the elimination of an atom of hydrogen in the form of halogenated acid and substitution in the place of the hydrogen, of the remainder of the molecule of the reacting product. The products obtained can be esterified, saponified, salified, chlorinated on the acid function, or amidified.

For example, by causing the bis(hydroxy-4-phenyl)-acetic acid to react with chlorine, there is obtained a product chlorinated on the nucleus, for example bis(dichloro-3,5-hydroxy-4-phenyl)acetic acid (I). The said chlorinated product after esterification (into product II), can be reacted for example with ethyl monochloro-acetate, which permits the production of the diethyl and monomethyl ester of bis(dichloro-3,5-carboxy-methoxy-4-phenyl)acetic acid (VIII); by saponification and hydrolysis of this latter, there is obtained bis(dichloro-3,5-carboxy-methoxy-4-phenyl)acetic acid (V).

By causing the ethyl monochloro-acetate to react with the methyl ester of bis(hydroxy-4-phenyl)acetic acid, there is obtained the diethyl and monomethyl ester of bis(carboxy-methoxy-4-phenyl)acetic acid (VII). Saponification followed by hydrolysis produces the bis(carboxy-methoxy-4-phenyl)acetic acid (IV), and the salification of this latter with methyl-2-imidazole gives the corresponding amine salt (IX).

Finally, by reaction of the acetyl chloride on bis(dichloro-3,5-hydroxy-4-phenyl)acetic acid, there is obtained the corresponding bis-acetylated derivative (X). The latter can be converted to acid chloride (XI) by reaction with thionyl chloride, and then to corresponding N,N-dimethyl-acetamide (XII), by the action of dimethyl-amine. Finally, by saponification of the acetylated amide (XII), there is obtained bis(dichloro-3,5-hydroxy-4-phenyl)-N,N-dimethyl-acetamide (XIII).

Similarly, in order to prepare the compounds XIV to XVI, the bis(hydroxy-4-phenyl)acetic acid or one of its esters is reacted preferably in the presence of an alkali, with a halide of alpha-epoxy having the formula:

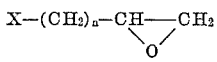

in which X represents an atom of chlorine or bromine, and the factor $n$ is equal to 1 or 2.

In order to simplify this, if the residue

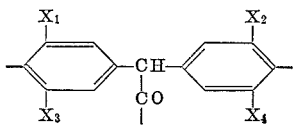

is represented by

the butyl ester of bis(hydroxy-4-phenyl)acetic acid is represented by:

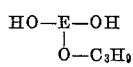

In accordance with the invention, this compound gives, by reaction with epichloro-hydrin, the butyl ester of bis(glycidyl-oxy-4-phenyl)acetic acid (XIV) following the simplified reaction:

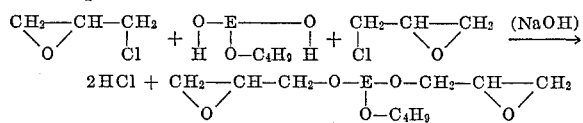

By causing the epichloro-hydrin to react in the presence of NaOH with bis(hydroxy-4-phenyl)acetic acid

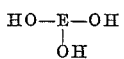

there is obtained the glycidyl ester of bis(glycidyl-oxy-4-phenyl)acetic acid (XV),

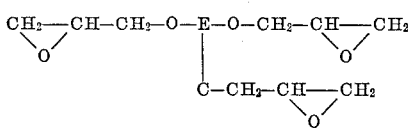

The following examples are given for the purpose of illustrating the invention, on the one hand with regard to the preparation of a certain number of the new compounds of the invention, and on the other hand with regard to some of their applications.

EXAMPLE 1

Bis(dichloro-3,5-hydroxy-4-phenyl)acetic acid

In a flask of 500 ml. fitted with a mechanical agitator, thermometer, reflux cooler and pipe for introducing gas beneath the surface of the liquid, 25 grams (0.1 mol) of bis(hydroxy-4-phenyl)acetic acid at a purity of 98% are dispersed in 200 ml. of technical chloroform.

A relatively rapid flow of chlorine (2 bubbles per second) are passed while agitating vigorously; the temperature rises rapidly and after about 10 minutes, becomes fixed at about 50° C. without external cooling. The product in suspension, initially white, takes on a violet tint and then partly dissolves. It finally re-precipitates in the form of a white powder when the operation is almost finished. After 30 minutes chlorination, the temperature begins to fall; the stirring is then continued for 30 minutes more while passing a slow flow of chlorine; it is then left to rest for one night.

The white precipitate obtained is dried, washed with 50 ml. of chloroform and then with 100 ml. of water. It is dried until it has a constant weight. 31 grams of the chlorinated product are collected.

This compound is soluble in ethanol, ether, acetone and aqueous alkaline solutions; it is insoluble in water.

This crude product can be purified by re-crystallization in a mixture of water and alcohol, 50/50 by volume. The chlorine content of the purified product is 34.4% by weight, and it melts at 210 to 215° C. with decomposition.

The alkaline salts of the said product are soluble in water. The sodium salt has the appearance of white needles; their acqueous solution is violet.

The chlorine content (34.4%) of the polychlorinated acid thus prepared is intermediate between that of the trichlorinated derivative and the tetrachlorinated derivative. It can be used as it is, in the purified state or otherwise, for various important uses, for example as a weed killer or for the chemical sterilization of the ground. It may also serve as a starting material for the preparation of chemical derivatives.

By operating in the manner indicated above for the preparation, but by pushing the chlorination further, there is finally obtained, after purification, a product of which the elementary analysis, the acid index and the other properties correspond substantially to the formula of bis (dichloro-3,5-hydroxy-4-phenyl) acetic acid.

EXAMPLE 2

Methyl ester of bis (dichloro-3,5-hydroxy-4-phenyl) acetic acid

There are dissolved in 200 ml. of pure methanol 38 grams (0.1 mol) of bis (dichloro-3,5-hydroxy-4-phenyl) acetic acid; 3 grams of concentrated sulphuric acid are then added and the mixture is brought up to the boil with reflux for 12 hours. Finally, 100 ml. of water is added and the excess alcohol is driven off under reduced pressure.

The residue is extracted with ether and the ether solution is directly evaporated to dry.

There are thus obtained 37.2 grams of crude ester having a melting point of 163–165° C. It can be used directly, either for its own qualities or to serve as a starting point for various syntheses.

Re-crystallization in a mixture of water and methanol at 50/50 by volume increases the melting point to 174–175° C.

The chlorine content of the product obtained is 34.6%. The calculated chlorine content for $C_{15}H_{10}O_4Cl_4$ is 35.8%.

The crystals are slightly soluble in water and very soluble in ethanol and ethyl ether.

EXAMPLE 3

Diethyl and monomethyl ester of bis (dichloro-3,5-carboxy-methoxy-4-phenyl) acetic acid 40 grams (0.1 mol.) of the methyl ester obtained in Example 2 are dissolved in 300 ml. of acetone. There are added successively to this solution, 55 grams (0.4 mol.) of anhydrous potassium carbonate, 3 grams of potassium iodide (catalyst) and 49 grams (0.4 mol.) of distilled ethyl monochloro-acetate. The whole is brought up to reflux for 20 hours and is filtered whole hot so as to eliminate the insoluble mineral salts which are then washed on a filter with 100 ml. of acetone. The combined acetone solution and the washing liquors are evaporated under vacuum. There is obtained a crude oil which, after separation from the excess ethyl monochloro-acetate which it contains, corresponds substantially to the formula of the triester indicated above. The crude oil may be used directly, either for its own qualities or to serve as a starting point for syntheses.

EXAMPLE 4

Bis (dichloro-3,5-carboxy-methoxy-4-phenyl) acetic acid

The crude oil obtained in Example 3 is saponified by adding it to 200 ml. of ethanol and 90 ml. of an 10 N aqueous solution of caustic soda. This is heated to boiling with reflux for two hours.

The alcohol is expelled by distillation; the residue is acidified to a pH value of 1 with a concentrated aqueous solution of hydrochloric acid, after which it is extracted with ether.

The ether solution is evaporated to dry under reduced pressure. The residue of the evaporation is re-crystallized in a solution containing 850 ml. of water and 200 ml. of ethyl alcohol.

There are obtained 27.5 grams of bis (dichloro-3,5-carboxy-methoxy-4-phenyl) acetic acid having a melting point of 219–221° C.

In addition, the product obtained has the following characteristics:

Chlorine content, percent _____ 27.66
Acid number _____ 331

The theoretical figures for the product having the formula $C_{18}H_{12}O_8Cl_4$ are:

Chlorine content, percent _____ 28.51
Acid number _____ 337

EXAMPLE 5

Diethyl and monomethyl ester of bis (carboxy-methoxy-4-phenyl) acetic acid

The methyl ester of bis (hydroxy-4-phenyl) acetic acid is first prepared. The esterification is carried out within a large excess of methanol with an acid catalyst. The alcohol is expelled by distillation under vacuum. The remaining mass is extracted with ether. The ether solution is washed with water and then evaporated under vacuum. The bis (hydroxy-4-phenyl) methyl acetate obtained has a melting point of 153–154° C.

25.8 grams (0.1 mol.) of this product are dissolved in 250 ml. of acetone; there are added 55.2 grams (0.4 mol.) of powdered anhydrous potassium carbonate, 4 grams of powdered potassium iodide and 49 grams (0.4 mol.) of ethyl monochloro-acetate.

The heterogenous mixture is heated to boiling with reflux for 20 hours. It is then filtered while hot to eliminate the insoluble mineral salts, which are washed with 50 ml. of acetone.

The combined acetone solution and the washing liquors are evaporated under vacuum. There is obtained a crude oil which, after separation from the excess ethyl mono-chloro-acetate which it contains, corresponds substantially to the formula of the triester indicated above. The crude oil can be utilized directly, either for its own qualities or to serve as the starting point for syntheses.

EXAMPLE 6

Bis (carboxy-methoxy-4-phenyl) acetic acid

The crude oil obtained in Example 5 is saponified. For this purpose, it is dissolved in 100 ml. of a mixture of equal parts by volume of water and ethanol. There is added 90 ml. of a 10 N aqueous solution of caustic soda, after which it is heated to boiling point with reflux for two hours.

After cooling, the solution is acidified to a pH value equal to 1 to 2 with a concentrated aqueous solution of hydrochloric acid ($d=1.19$). After this, the alcohol is removed under reduced pressure and then the triacid is extracted with ether.

The ether solution is evaporated dry. The residue of the evaporation is re-crystallized in an alcohol-benzene mixture.

The above-indicated triacid is obtained with a degree of purity coresponding to an acid number of 463, whereas the theoretical value for the acid number is 467.

The triacid obtained has a melting point of 95–96° C.

This triacid can be converted to a tri-sodium salt. For this purpose, the crude product resulting from the extraction with ether can be employed. The residue is treated with ethanol and neutralized to a pH value of 9 with a concentrated aqueous solution of caustic soda. The salt is precipitated by cooling and is then washed with a little alcohol and dried under vacuum at 60° C. The tri-sodium salt obtained is practically pure.

EXAMPLE 7

Salt of bis (dichloro-3,5-hydroxy-4-phenyl) acetic acid with methyl-2-imidazole 150 grams of crude bis (dichloro-3,5-hydroxy-4-phenyl) acetic acid having a chlorine content of 34.4% is dissolved while hot in 300 ml. of denatured ethanol.

On the other hand, there are dissolved in 35 ml. of ethanol while hot, 34 grams of methyl-2-imidazole, that is to say the quantity calculated to neutralize exactly the acid employed.

The two solutions are then mixed together in the hot state. There is an almost immediate crystallization of the expected salt. This is dried, washed with a little alcohol and again dried.

The weight of salt obtained is 120 grms. Its melting point is from 223 to 224° C., with decomposition.

In addition, the product obtain has the following characteristics:

Molecular weight _____ 456
Chlorine content _____percent__ 29.1
Nitrogen content _____do____ 6.2

The theoretical figures for the product having the formula: $C_{18}H_{14}Sl_4O_4N_2$ are as follows:

Molecular weight _____ 464
Chlorine content _____percent__ 30.6
Nitrogen content _____do____ 6.04

EXAMPLE 8

Bis (dichloro-3,5-acetoxy-4-phenyl) acetic acid; bis (dichloro-3,5-acetoxy-4-phenyl) aceto-chloride; bis (dichloro-3,5-acetoxy-4-phenyl)-N,N-dimethyl-acetamide By acetylation of the phenol hydroxyls of bis (dichloro-3,5-hydroxy-4-phenyl) acetic acid by means of acetyl chloride, there is obtained without difficulty bis (dichloro 3,5-acetoxy-4-phenyl) acetic acid.

This latter, heated to boiling point with reflux for 2½ hours in a benzene medium with thionyl chloride is converted to bis (dichloro-3,5-acetoxy-4-phenyl) aceto-chloride.

107.6 grams of the crude acid chloride obtained are dissolved in 800 ml. of anhydrous benzene. There is then added, drop by drop while stirring and maintaining the temperature between +5 and +10° C. a 30% benzene solution of dimethyl amine until a definitely alkaline pH value is obtained. The medium becomes very thick and turns pale yellow.

The mixture is then left to rest at ambient temperature for example for one night; there are then added 1,000 ml. of water, which causes a separation into two layers. The yellow benzene layer is decanted. The remaining aqueous solution (which is an intense blue-violet colour) is extracted three times with 100 ml. of benzene. This extract is added to the benzene solution and the whole mixture is concentrated under reduced pressure.

There are obtained 105.9 grams of a pale yellow solid product. This latter, after re-crystallization in ethyl alcohol (or benzene) gives 72 grams of bis(dichloro-3,5-acetoxy-3-phenyl)-N,N-dimethyl-acetamide having a boiling point of 175–182° C. The nitrogen content of the product obtained is 2.86%; the theoretical figure, for the product having the formula $C_{20}H_{17}O_5NCl_4$, with regard to the nitrogen content is 2.84%.

EXAMPLE 9

Bis (dichloro-3,5-hydroxy-4-phenyl)-N,N-dimethyl-acetamide)

160 grams of the product obtained in Example 8 are dissolved in 1,000 ml. of ethyl alcohol. There are then added 200 ml. of 10 N caustic soda lye, after which the mixture is heated to boiling with reflux for 2 hours.

After the addition of 200 ml. of water, the alcohol is removed under vacuum and the mixture is then neutralized to a pH value of 7 with a concentrated aqueous solution of hydrochloric acid. The precipitate obtained is filtered and then washed with a little water, after which it is dried at 60° C. under vacuum. There are obtained 122.5 grams of bis (dichloro-3,5-hydroxy-4-phenyl)N,N - dimethyl-acetamide (yied=92%). The melting point of the product obtained is 210–213° C.

In addition, the product obtained has the following characteristics:

| | Percent |
|---|---|
| Nitrogen content | 3.45 |
| Chlorine content | 34.26 |
| Carbon content | 47.73 |
| Hydrogen content | 3.50 |

The theoretical figures for the product having the formula $C_{16}H_{13}O_3NCl_4$ are as follows:

| | Percent |
|---|---|
| Nitrogen content | 3.42 |
| Chlorine content | 34.71 |
| Carbon content | 47.0 |
| Hydrogen content | 3.18 |

With regard to the industrial application of these various new products, a few indications will be given purely by way of illustration.

The bis (hydroxy-4-phenyl) chlorinated acetic acids of the type indicated above posses a remarkable phytocidal activity. With a large proportion of active material (60 to 100 kg. of equivalent acid per hectare), they make it possible to obtain the chemical sterilization of the soil; with a medium proportion (comprised between 20 and 50 kg. of equivalent acid per hectare), they act as complete weed-killers; finally, in smaller proportions (from 8 to 10 kg. per hectare) they permit the selective destruction of troublesome annual graminaceae.

For these different treatments there can be employed for example the chlorinated derivatives of the methyl ester of bis (hydroxy-4-phenyl) acetic acid, when so required with different rates of chlorination: high rates for the sterilization of the soil and for killing all weeds; lower rates for selective weed-killing.

For all these applications, it is essential to apply the active material in an aqueous or oily vehicle and by spraying. The desired quantity of active material can for example be sprayed in a volume of water between 150 and 1,000 litres per hectare, depending on the type of apparatus employed for spraying.

The sterilizing action of this weed-remover applied on the ground prevents the germination, the coming through and the growth of any plant on the treated areas. This is applicable both to the seeds present "in situ" at the time of treatment and to those which might ultimately be brought onto or into the ground treated by wind, water, etc.

In its utilization as a complete weed-killer, the action bill, milk-weed, chick-weed, buttercups, etc.) and to the bill, mild-weed, chick-weed, buttercups, etc.) and to the monocotyledons (fox-tail, digitalis, holcus, etc.).

Finally, when used as a selective weed-killer, this compound permits the selective destruction of undesirable annual graminaceae such as fox-tail, rye-grass, wild oats, in a certain number of cultivated crops such as colza, flax, vines and orchards (fruit trees with fruit having pips and cores), citrus fruit, banana trees, sugar cane, etc.

The simultaneously chlorinated and carboxy-methylated products, especially for example that of Example 3, are quite particularly suitable for the selective cleaning of cereals (wheat, barley, oats, maize, rice, etc.), for the cleaning of permanent fields, lawns; for the destruction of woody vegetation (perennial or shrubby plants); for the destruction of undesirable aquatic weeds; for the cleaning of fruit tree cultivation (apple trees, pear trees, peach trees) of vines and small fruit (strawberry plants after cropping).

The chlorinated and amido-compounds, such as that of Example 9 have the special feature of having considerable phytocidal activity in respect of plants of the graminaceous family and more particularly against the undesirable graminaceae in cultivated crops. On the other hand, the non-graminaceous plants are practically unaffected by these compounds, even with a high proportion of active material per hectare. There is thus available here a selective weed-killer of great interest since: it is not toxic for human beings or animals; it is very effective against the undesirable graminaceae of cultivated crops; it is not phytotoxic for these crops. In addition, the efficacy of the product does not appear to be affected by the nature of the soil or of the climate.

EXAMPLE 10

Preparation of product XIV

There is first prepared the butyl ester of bis (hydroxy-4-phenyl) acetic acid and then this is epoxided with chloro-3-epoxy-1,2 propane.

In a flask of 2 litres, there are introduced 122 grams of bis (hydroxy-4-phenyl) acetic acid (0.5 mol.) 74 grams of butanol (1 mol.), 500 ml. of benzene and 3 ml. of sulphuric acid at 66° Baumé.

This mixture is then heated to boiling while recovering 15 ml. of water in 4 hours reaction. The temperature rises from 77° to 82° C.

475 ml. of benzene are then distilled and 200 ml. of water are added. The precipitate is filtered and washed twice with 200 ml. of water, the water is removed, and finally it is dried.

There are obtained 141 grams of dry butyl ester, namely 94% of the theoretical quantity.

In a 2-litre flask there are placed 333 grams of epichloro-hydrin (3.6 mols.), 100 grams of butyl ester of bis (hydroxy-4-phenyl) acetic acid (0.33 mol.) and 75 grams of isopropanol. The mixture is brought up to reflux (96° C.) and there is then introduced into the flask in 40 minutes, 32 grams of caustic soda previously dissolved in 32 grams of water.

After having left to digest for 30 minutes, the mixture is distilled under normal pressure up to 105° C.; then it is filtered so as to eliminate the separated sodium chloride. The filtrate is again subjected to distillation under a vacuum of 6 mm.

The distillation is carried out until the temperature inside the flask reaches 110° C.

There are thus obtained 118 grams of butyl ester of bis (glycidyl-oxy-4-phenyl) acetic acid, which represents a yield of 86% of the theoretical value.

The product obtained has a molecular weight of 412 and is very pure, since its epoxide number, determined by analysis, is 0.46, while the number of theoretical epoxide (that is to say the calculated number of epoxy groups per 100 grams of product) is 0.48.

Rough formula of the compound: $C_{24}H_{26}O_6$
C%: theory=69.9; determined=69.4
H%: theory=6.8; determined: 6.82

This product, known as "Product XIV" for the sake of simplicity, is in the form of a liquid of light amber colour, having a viscosity of 27 to 36 stokes; it is soluble in xylene and Cellosolve, and in addition it has an excellent solubility in butanol, which gives it a superiority as compared with the conventional epoxy compounds.

Furthermore, by reason of its excellent compatibility in very different media, the product XIV enables technical progress to be obtained, especially for example in the application of thermosetting acrylic resins.

In particular, a very important case is that of acrylic paints.

By way of example, there was prepared a solution of polymer with the following ingredients. 25 parts by weight of styrene + 33.15 parts of methyl methacrylate + 28.8 parts of butyl acrylate + 12 parts of acrylamide + 0.96 part of acrylic acid + 0.64 part of lauryl-mercaptan + 0.45 part of glyoxal tetra-allyl-acetal (which is the object of the applicants' French Patent No. 1,280,792 of Oct. 26, 1960). The solvents utilized were xylene + butanol.

The polymerization was carried out with reflux in the presence of benzoyl peroxide, until the measured dry extract attained a resin content of 50%. This was then converted to paint by adding an epoxy compound (see below) and pigmenting with titanium oxide. For this purpose, the titanium oxide (rutile) was dispersed in an ethyl-glycol, methyl-glycol and ethyl-glycol acetate mixture, and incorporated in the resin solution so as to obtain finally a ratio of pigment/resin (expressed as dry material) of 0.73.

In the case of conventional epoxy resins, the epoxy is generally added at the time of use, that is to say at the moment of preparation of the paint and just before the paint is used. If the epoxy resin were mixed at the outset with the acrylic resin, it would give rise during storage to a cloudiness or even a precipitation in the mixture, which would adversely affect its qualities as a coating product.

This serious drawback can be avoided if the conventional epoxy resins are replaced by certain products of the present invention, for example by the product XIV.

In order to bring out clearly the performances obtainable with the products according to the invention, samples were first prepared of the following products:

($A_0$) To a solution of polymer prepared in the manner indicated above, there was intimately mixed a quantity of product XIV corresponding to 12% of the weight of dry polymer.

($B_0$) The same preparation but the product XIV being replaced by an identical weight of a conventional epoxy resin.

($A_3$) A part of sample $A_0$ was stored for three months and thus became sample $A_3$.

($B_3$) A part of the sample $B_0$ was stored for three months and thus became sample $B_3$.

($pA_0$) The mixture $A_0$ (freshly prepared) was converted to paint in the manner indicated above; this resulted in the paint $pA_0$.

($pB_0$) In the same way, the mixture $B_0$ (freshly prepared) was converted to the paint $pB_0$.

($pA_3$) In the same manner, the mixture $A_3$ (stored for three months) was converted to the paint $pA_3$.

($pB_3$) In the same manner, the mixture $B_3$ (stored for three months) was converted to the paint $pB_3$.

The paints $pA_0$, $pB_0$, $pA_3$ and $pB_3$ were utilized immediately after they were prepared.

With these various samples, the following have been noted:

(1) Mixtures of polymer and epoxy product after three months storage

*Sample $A_3$.*—Unchanged, solution perfectly clear.

*Sample $B_3$.*—Intensely clouded; slight precipitate (such a difference is already very important commercially since a resin which clouds during storage and which deposits a precipitate is hardly saleable).

(2) Paints made with the freshly-prepared mixtures

For the tests of determination of quality, the paints were applied by means of a Touzart & Matignon applicator on plates of chilled de-greased steel having the dimensions 200 x 100 x 1 mm.

A film of paint was applied so as to obtain a thickness of 30 to 40 microns.

A pre-drying is effected for 10 minutes with protection from dust and the film is then baked at 180 C. for 30 minutes in a ventilated oven, after which the plates are left in the surrounding atmosphere for 24 hours before the measurements are made; these are carried out at a temperautre as close to 20° C. as possible.

The tests of quality are then carried out (hardness, flexibility, resistance to shocks, adherence, brilliance, resistance to detergents, resistance to hot grease, resistance to solvents, etc.).

The flexibility for example is measured by means of an Ericksen apparatus (Touzart & Matignon). It is expressed in millimetres of penetration up to breaking of the film.

The hardness is measured with the Persoz clock on a zone of thickness comprised between 30 and 40 microns. The mean of three measurements is taken. The difference between each measurement should not exceed 5 seconds.

The brilliance is measured with the Persoz luminosity meter. The measurements are made in comparison with a standard plate, the brilliance of which is taken as 100.

*Results.*—Practically no differences were observed with regard to the tests of quality of the paints $pA_0$ and $pB_0$.

(3) Paints made with the mixtures stored for three months

*Sample $pA_3$.*—The results of the quality tests are practically the same as for the paints $pA_0$ and $pB_0$.

*Sample $pB_3$.*—The results of the quality tests are definitely inferior to those of the paints $pA_0$ and $pB_0$, especially with regard to: Flexibility—the test value of which fell to 6 (against about 9 for $pA_3$, $pA_0$ and $pB_0$); brilliance—which fell to 62% (against about 87% for $pA_3$, $pA_0$ and $pB_0$).

In consequence, as compared with a conventional epoxy resin, the product XIV gives definitely superior technical performances in acrylic paints.

EXAMPLE 11

This example is intended to show that the product XIV, prepared in accordance with Example 10 is a useful raw material for the preparation of a new category of epoxy resins.

Into a steel receptacle there are introduced 103 grams (0.25 mol.) of butyl ester of bis(glycidyl-oxy-4-phenyl) acetic acid. There are then added 0.33 gram of caustic soda in solution in 1 gram of water. There are then introduced 63.5 grams (0.26 mol.) of bis (hydroxy-4-phenyl) acetic acid.

The mixture is brought slowly to 148° C. and is held for 30 to 25 minutes at this temperature, after which it is allowed to cool. The resin obtained hardens very rapidly. It can be sprayed with ease. It is wholly soluble in butanol, in methyl-ethyl-ketone, in methyl-Cellosolve; it is insoluble in xylene and pine oil.

The films prepared with this resin have remarkable characteristics, in particular as regards brilliance and hardness. A 50% solution of the resin in Cellosolve was applied on a steel sheet and baked at 180° C. for 30 minutes (thickness of the film: 30 to 40 microns). The characteristics of hardness and brilliance of this film were as follows:

Persoz hardness _____ 100 (which corresponds to the maximum possible).

Brilliance _____ 6 minutes, 10 seconds.

EXAMPLE 12

Preparation of product XV

In a flask of 2 litres, there is heated to boiling a mixture of 126 grams of bis (hydroxy-4-phenyl) acetic acid at 97% (0.5 mol.), 694 grams of epichloro-hydrin and 75 grams of isopropanol. There is then introduced in 45 minutes, 63 grams of caustic soda previously dissolved in 67 grams of water. The boiling is continued for half-an-hour, after which the mixture is distilled up to 110° C. at ordinary pressure, in order to eliminate the isopropyl alcohol, the water and excess epichloro-hydrin. The mixture is cooled at room temperature and filtered to eliminate the precipitated sodium chloride. It is then re-distilled under a vacuum of 35 mm. of mercury up to 110° C.

In this way, there are collected 165 grams of solid product of a pale amber colour which, following analysis, is found to be the glycidyl ester of bis (glycidyl-oxy-4-phenyl) acetic acid (product XV):

Empirical formula: $C_{23}H_{24}O_7$
Epoxy number found: 0.71 (theoretical 0.728)

The product XV is soluble in the aromatic solvents such as benzene, toluene, xylene, and also in dioxanne; it is insoluble in the alcohols.

It is to be noted that the products XIV and XV can be applied as herbicidal agents as the products of the preceding examples.

It will of course be understood that the present invention has only been described purely by ways of explanation and not in a limitative sense and that any useful modification may be made thereto without departing from its scope.

What is claimed is:

1. The butyl ester of bis (glycidyl-oxy-4-phenyl) acetic acid having the formula:

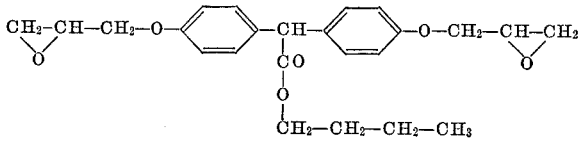

References Cited

UNITED STATES PATENTS 3,268,619   8/1966   Nametz _____ 260—348

FOREIGN PATENTS 253,030   5/1963   Australia.

OTHER REFERENCES

Chemical Abstracts, vol. 55, November 1961, p. 23439.

NORMA S. MILESTONE, Primary Examiner

U.S. Cl. X.R.

71—88, 107, 115, 118; 106—299; 117—161, 132; 260—47, 80, 72, 309, 348.6, 469, 476, 473, 479, 520, 559

UNITED STATES PATENT OFFICE
CERTIFICATE OF CORRECTION

Patent No. 3,499,008                          March 3, 1970

Pierre Talet et al.

It is certified that error appears in the above identified patent and that said Letters Patent are hereby corrected as shown below:

In the heading to the printed specification, line 8, "Claims priority, application France, Apr. 29, 1964, 972,884" should read -- Claims priority, application France, Apr. 29, 1964, 972,884; Dec. 21, 1964, 999,456 --.

Signed and sealed this 8th day of December 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,499,008                     Dated March 3, 1970

Inventor(s) Pierre Talet and Robert Behar

It is certified that error appears in the above-identified patent and that said Letters Patent are hereby corrected as shown below:

Column 10, line 68, to read as follows:

Rough formula of the compound: $C_{24}H_{28}O_6$

Signed and sealed this 18th day of May 1971.

(SEAL)
Attest:

EDWARD M. FLETCHER, JR.          WILLIAM E. SCHUYLER, JR.
Attesting Officer                Commissioner of Patents